Patented May 19, 1942

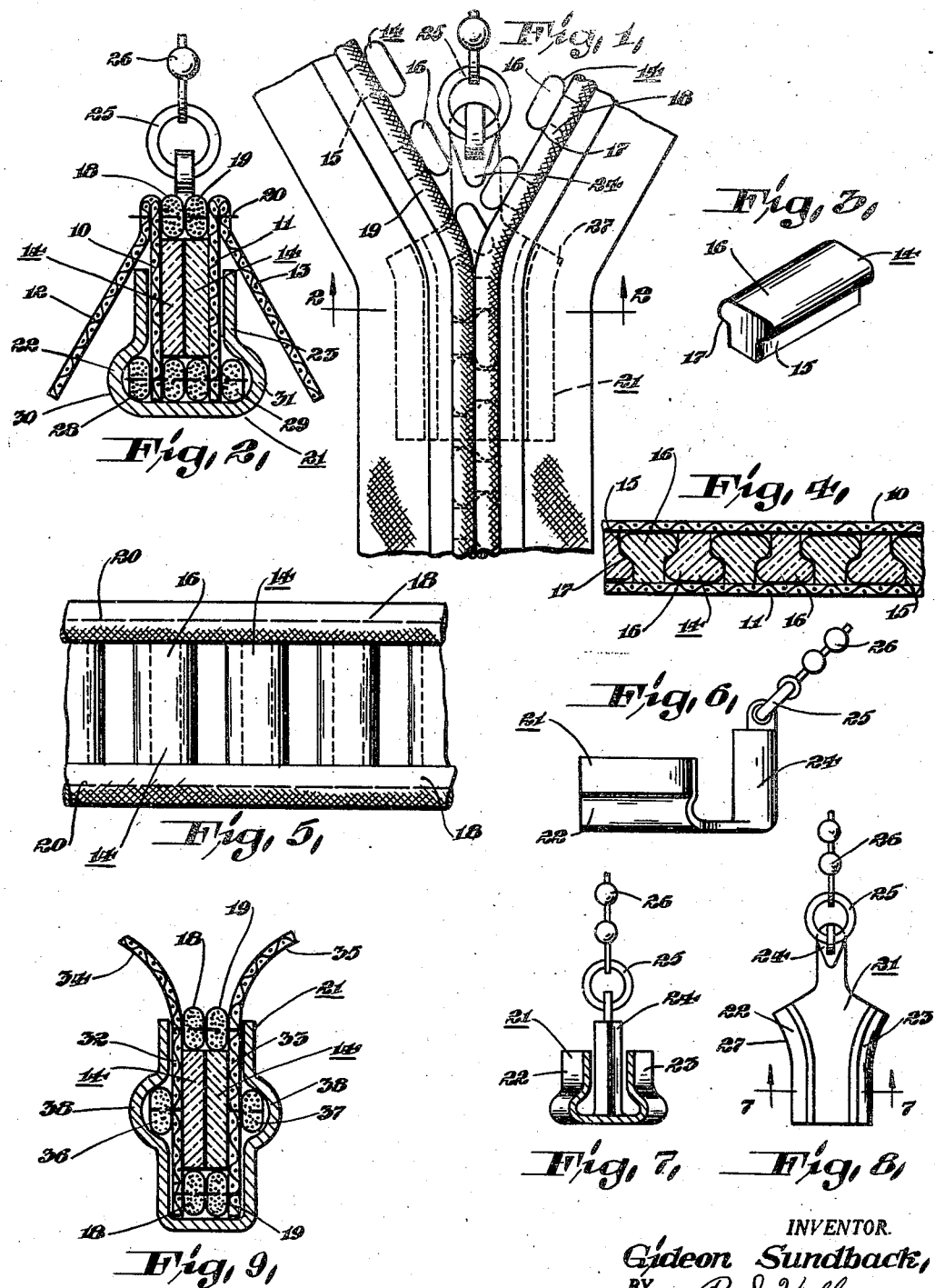
May 19, 1942. G. SUNDBACK 2,283,590
MULTIPLE OPERATED FASTENER
Filed Dec. 27, 1940
INVENTOR.
Gideon Sundback,
BY R. S. Kelley.
ATTORNEY.

2,283,590

UNITED STATES PATENT OFFICE 2,283,590

MULTIPLE OPERATED FASTENER

Gideon Sundback, Meadville, Pa., assignor to Talon, Inc., Meadville, Pa., a corporation of Pennsylvania Application December 27, 1940, Serial No. 371,873

6 Claims. (Cl. 24—205)

My invention relates to fasteners and more particularly to quickly operated multiple fasteners arranged in continuous series along the edges of the gap or opening to be closed.

The fastener of the present invention is especially suitable for bags, pouches and the like.

One of the objects of the invention is to provide a secure quickly operated fastener which shall be inconspicuous, especially when applied in bags, pouches and the like.

A further object of the invention is to provide an improved fastener of the class referred to which can be operated by a slider and in which the slider has an extremely smooth quiet action as compared to slide fasteners now in common use.

Another object of the invention is to provide a continuous fastener especially useful for bags or pouches, which can be economically made and applied to the bag, and which may be attached directly to the bag without the use of fabric tapes or the like.

In the accompanying drawing I have shown for purposes of illustration two embodiments which my invention may assume in practice. In the drawing:

Fig. 1 is a plan view showing a portion of a length of my improved fastener;

Fig. 2 is a cross-sectional view on line 2—2 of Fig. 1;

Fig. 3 is a perspective view of one of the fastener elements;

Fig. 4 is a horizontal sectional view through the fastener members when the fastener is closed;

Fig. 5 is an inside face view of one series of fastener elements;

Figs. 6, 7 and 8 are side, cross-sectional and plan views, respectively, of the slider on the fastener in Fig. 1; and Fig. 9 is a cross-section corresponding to Fig. 2, showing a modified construction.

My improved fastener generally comprises flexible side members 10 and 11 arranged in parallel relation and extending throughout the length of the fastener. These side members are preferably of fabric and as shown in Fig. 2, they may be formed by folding the edges of the side walls 12, and 13 of a bag or pouch. The fastener elements are preferably made from a light weight plastic material such as cellulose acetate and have the shape of elongated bars 14 whose cross-section resembles a short T. These bar shaped elements have their narrower flat sides 15 positioned against the fabric side members 10 or 11 and the bar members are secured to the side members in uniformly spaced apart relation, preferably by adhesively securing the elements directly to the face of the side members throughout their contacting surfaces. The elements may be made to adhere to the side members by the use of cement, glue or the like, or by softening the material of the fastener elements by the use of heat or a suitable solvent sufficiently to cause it to adhere to the flexible side member.

The elements on the opposite side members 10 and 11 are arranged in staggered relation and so spaced apart that the space between two adjacent elements on one side corresponds in size and shape to one of the fastener elements so that a fastener element on the opposite side may fit between two such elements on the opposite side. Although the elements may be of any suitable shape which will allow them to dovetail into one another, as shown, their base portion or attaching portion is relatively narrower than the head portion 16 so as to provide shoulders 17 on each side of the head portion which interlock behind similar shoulders 17 on an adjacent element on the opposite series. By reason of this construction the fastener elements will hold the sides of the bag or other flat members together against any lateral stresses which may be caused by the contents of the bag or by a side pull on the sides of the bag, which would have a tendency to open the fastener.

The elements are prevented from shifting endwise relative to one another by suitable means which close the recesses between adjacent fastener elements at their ends. In the present instant this is accomplished by continuous flexible cords 18 on one side, and 19 on the other side, running lengthwise of the series of fastener elements and along their ends. The cords are attached to the flexible side members 10 and 11 preferably by lines of stitching 20.

The elements are brought progressively into interlocking relation by means of a cam or slider generally designated 21. The slider comprises generally a U-shaped portion having side walls 22, 23 adapted to embrace and slide along the outer surfaces of the side members 10 and 11. Extending from the U-shaped portion is a vertical wedge portion 24, which extends upwardly through the cords 18, 19 and carries the pull attaching loop 25. Suitable means for operating the slider is attached to this loop, such, for example, as a pull chain 26. The walls 22, 23 of the slider are preferably flared outwardly adjacent the wedge portion 24 as indicated at 27, so that they will feed or guide the side members toward each other during closing movement of the fastener. The wedge shaped portion 24 will operate to spread apart the interlocking portion of the fastener elements and thus open the fastener. For the purpose of holding the slider in position on the fastener, it is necessary to provide suitable guide members, such as the beads 28, 29, attached to the outer surfaces of the side members 10 and 11. These beads may be hard fabric cords, and preferably are attached by one of the lines of stitching 20. The side walls of the slider have suitable grooves 30, 31 to fit over the guide members 28 and 29.

In the modified construction illustrated in Fig. 9 the side members 32, 33 corresponding to the side members 10 and 11, may be provided by utilizing the free edges of the side walls 34, 35, of a bag or pouch or of any other article to be fastened. The interlocking feature of the fastener is the same as that of the fastener shown in Figs. 1 to 5.

The slider is of somewhat different construction and since it rides over the outside surfaces of the bag or other article, it does not need to have a special extension for a pull tab. It can be simply grasped by the fingers to operate it in either direction. In this case also the guiding beads 36, 37 and guide grooves 38 in the slider are preferably arranged intermediate the ends of the fastener members. The construction and operation of the slider is otherwise substantially the same as that of the slider shown in Figs. 6, 7 and 8 except that the wedge portion does not have a loop extension such as 25. If desired even the slider may be eliminated and the fastener closed by moving the thumb and finger along the fastener from one end to the other in known manner.

While I have shown and described in this application two embodiments which my invention may assume in practice, these embodiments are merely for the purposes of illustration and description and other forms may be devised within the scope of my invention as defined in the appended claims.

Having thus fully described my invention, what I claim as new and desire to secure by Letters Patent is:

1. A fastener of the class described, comprising flexible side members arranged in parallel relation, multiple series of fastener elements attached to and arranged between parallel surfaces of said flexible side members, said fastener elements comprising elongated bar-shaped members extending perpendicularly to the line of the fastener and being of such shape that they will dovetail into one another and interlock.

2. A fastener of the class described comprising a pair of flexible tapes, a pair of parallel spaced flexible members attached to one side of each of said tapes, cooperating series of uniformly spaced fastener elements attached to said tapes, said elements arranged between and perpendicular to said flexible members, the fastener elements on one tape being adapted to enter between the elements on the opposite tape, and said flexible members adapted to resist endwise disengagement of the elements.

3. A fastener of the class described comprising a pair of flexible tapes having a pair of spaced parallel flexible cords attached to one face of each of said tapes, a multiple series of uniformly spaced fastener elements attached to said tapes and arranged between said cords, perpendicularly thereto, the fastener elements on one tape being adapted to enter between the elements on the opposite tape, and said cords adapted to keep the elements aligned and to resist endwise disengagement thereof.

4. A multiple fastener of the class described, comprising a pair of flat flexible members, to be fastened together and arranged with adjacent flat portions facing each other, a series of fastener elements on a flat face of one member having interlocking devices thereon for interlocking engagement with a corresponding series of fastener elements on the adjacent flat face of the other member, and longitudinally extending beads attached to said flat members on the opposite sides thereof from said series of fastener members.

5. A multiple fastener of the class described, comprising a pair of flat flexible members to be fastened together and arranged with adjacent flat portions facing each other, a series of fastener elements on a flat face of one member having interlocking devices thereon for interlocking engagement with a corresponding series of fastener elements on the adjacent flat face of the other member, longitudinally extending beads attached to said flat members on the opposite sides thereof from said series of fastener elements and a slider embracing the portions of said flat members to be fastened together, and having grooves cooperating with said beads whereby the slider is held in place as it moves along the fastener.

6. Fastening means for a bag, pouch or the like which has two walls with free edges to be fastened together, two co-operating series of fastener elements one of which is attached directly to the inner face of each wall, said fastener elements consisting of bars of T-shaped cross section perpendicular to the edges of the walls, and said fastener elements having interlocking portions cooperating with each other to fasten the same together, flexible cords attached to the walls on the inside faces thereof and extending along the ends of the fastener elements, and a pair of beads on the outer surfaces of the walls opposite said series of fastener elements.

GIDEON SUNDBACK.